United States Patent
Gould et al.

(10) Patent No.: US 11,214,217 B2
(45) Date of Patent: Jan. 4, 2022

(54) OCCUPANT RESTRAINT SYSTEM

(71) Applicant: ZF Passive Safety Systems US Inc., Washington, MI (US)

(72) Inventors: Douglas M. Gould, Lake Orion, MI (US); Gabriela Diaz, Royal Oak, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 13 days.

(21) Appl. No.: 16/804,089

(22) Filed: Feb. 28, 2020

(65) Prior Publication Data

US 2021/0268986 A1    Sep. 2, 2021

(51) Int. Cl.
*B60R 21/214* (2011.01)
*B60R 21/215* (2011.01)

(52) U.S. Cl.
CPC .......... *B60R 21/214* (2013.01); *B60R 21/215* (2013.01)

(58) Field of Classification Search
CPC ........................... B60R 21/214; B60R 21/215
See application file for complete search history.

(56) References Cited

U.S. PATENT DOCUMENTS

| | | | | |
|---|---|---|---|---|
| 7,163,229 B2* | 1/2007 | Hasebe | ................ | B60R 21/233 280/730.1 |
| 8,353,529 B2* | 1/2013 | Tomitaka | .............. | B60R 21/231 280/730.2 |
| 2004/0090050 A1* | 5/2004 | Dominissini | ........ | B60R 21/213 280/730.1 |
| 2010/0327567 A1* | 12/2010 | Choi | ..................... | B60R 21/214 280/730.2 |
| 2019/0161049 A1* | 5/2019 | Thomas | ................ | B60R 21/215 |
| 2020/0406852 A1* | 12/2020 | Fischer | ................... | B60R 21/26 |
| 2020/0406853 A1* | 12/2020 | Fischer | ................ | B60R 21/233 |
| 2021/0101559 A1* | 4/2021 | Fischer | ................ | B60R 21/232 |

* cited by examiner

*Primary Examiner* — Drew J Brown
(74) *Attorney, Agent, or Firm* — Tarolli, Sundheim, Covell & Tummino LLP

(57) ABSTRACT

A module for an airbag for helping to protect an occupant of a vehicle having a roof and an interior with a seat for the occupant includes a housing positioned in the roof. The housing includes a wall with openings extending therethrough. The wall defines an interior space for receiving the airbag. A door includes projections extending into the openings for securing the door to the housing and closing the interior space. The door includes a weakened portion that ruptures in response to inflation of the airbag for allowing the airbag to deploy into the cabin. A door closes the interior space and includes a weakened portion that ruptures in response to inflation of the airbag for allowing the airbag to deploy into the cabin. Fasteners are connected to the door and extend into the openings for securing the door to the housing.

20 Claims, 15 Drawing Sheets

OCCUPANT RESTRAINT SYSTEM

TECHNICAL FIELD

The present invention relates generally to vehicle airbags and, in particular, relates to a roof-mounted airbag module.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free to utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

In one aspect, a module for an airbag for helping to protect an occupant of a vehicle having a roof and an interior with a seat for the occupant includes a housing positioned in the roof. The housing includes a wall with openings extending therethrough. The wall defines an interior space for receiving the airbag. A door includes projections extending into the openings for securing the door to the housing and closing the interior space. The door includes a weakened portion that ruptures in response to inflation of the airbag for allowing the airbag to deploy into the cabin. A door closes the interior space and includes a weakened portion that ruptures in response to inflation of the airbag for allowing the airbag to deploy into the cabin. Fasteners are connected to the door and extend into the openings for securing the door to the housing.

In another aspect, a module for an airbag for helping to protect an occupant of a vehicle having a roof and an interior with a seat for the occupant includes a housing positioned in the roof. The housing includes a wall with openings extending therethrough. The wall defines an interior space for receiving the airbag. A door includes a first side facing the roof and a second, opposing side facing the vehicle interior. Projections extend from the first side and form snap-fit connections with the openings for securing the door to the housing and closing the interior space. A weakened portion extends from the first side towards the second side and ruptures in response to inflation of the airbag for allowing the airbag to deploy into the cabin.

In another aspect, a module for an airbag for helping to protect an occupant of a vehicle having a roof and an interior with a seat for the occupant includes a housing positioned in the roof. The housing includes a wall defining an interior space for receiving the airbag. A door is formed integrally with a roof liner of the vehicle for closing the interior space. The door includes a first side facing the roof and a second, opposing side facing the vehicle interior. A weakened portion extends from the first side towards the second side and rupturing in response to inflation of the airbag for allowing the airbag to deploy into the cabin.

According to one aspect, taken alone or in combination with any other aspect, the housing is integrally formed in a roof liner of the roof.

According to one aspect, taken alone or in combination with any other aspect, the housing is positioned in a pocket within a roof liner of the roof.

According to one aspect, taken alone or in combination with any other aspect, the door includes a first side facing the roof and a second, opposing side facing the vehicle interior. The weakened portion extends from the first side towards the second side.

According to one aspect, taken alone or in combination with any other aspect, the weakened portion extends in an inboard-outboard direction of the vehicle.

According to one aspect, taken alone or in combination with any other aspect, the weakened portion extends in a forward-rearward direction of the vehicle.

According to one aspect, taken alone or in combination with any other aspect, the door is concealed from view from the occupant prior to inflation of the airbag.

According to one aspect, taken alone or in combination with any other aspect, the fasteners constitute projections integrally formed with the door.

According to one aspect, taken alone or in combination with any other aspect, the projections form snap-fit connections with the corresponding openings in the wall.

According to one aspect, taken alone or in combination with any other aspect, the housing is positioned laterally between the seats and side structure of the vehicle.

According to one aspect, taken alone or in combination with any other aspect, the openings are provided in pairs on opposite sides of a centerline of the housing and the projections are provided in pairs on opposite sides of a centerline of the door.

According to one aspect, taken alone or in combination with any other aspect, the door abuts the wall to enclose the airbag within the housing.

According to one aspect, taken alone or in combination with any other aspect, the door is defined by a second weakened portion in the roof liner surrounding the weakened portion.

Other objects and advantages and a fuller understanding of the invention will be had from the following detailed description and the accompanying drawings.

DETAILED DESCRIPTION

Figure 1:
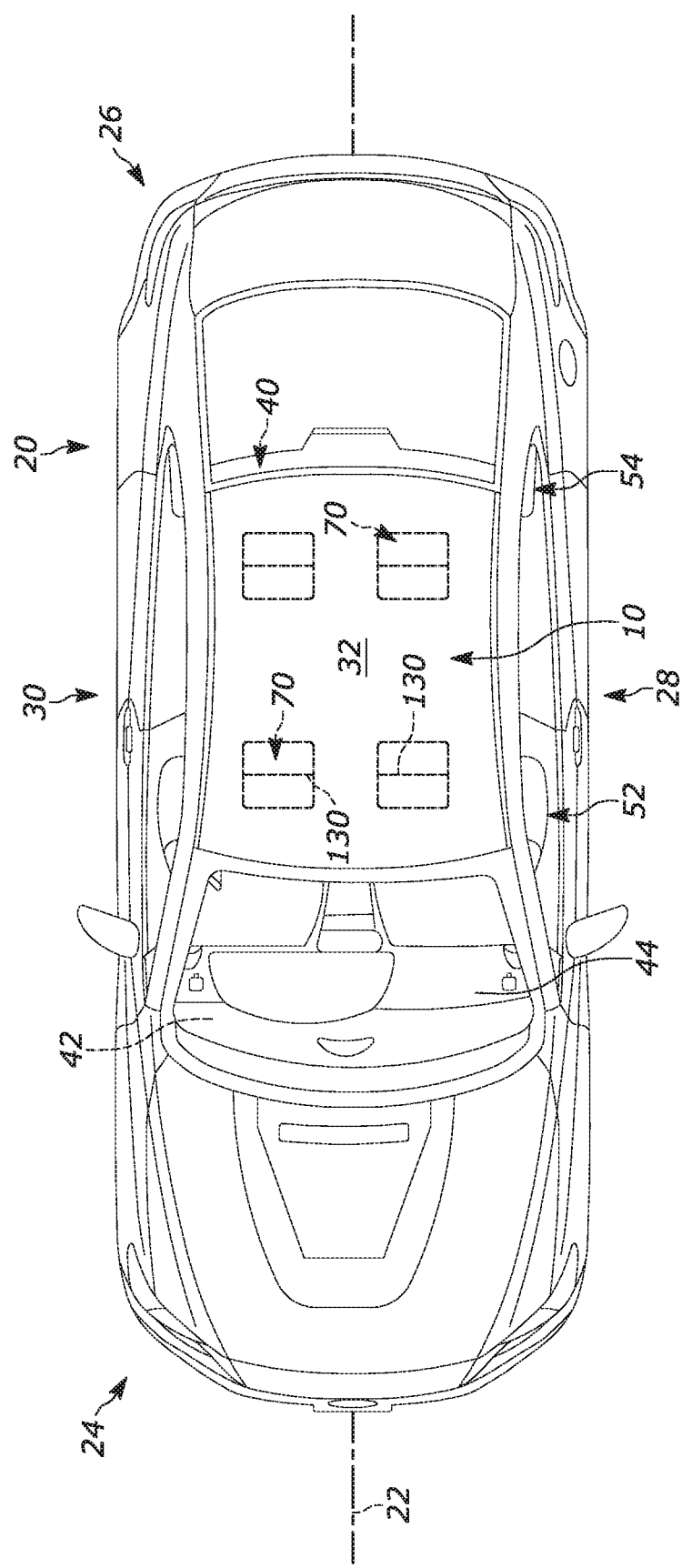
FIG. 1 is a top view of a vehicle including an example occupant restraint system.
Figure 2:
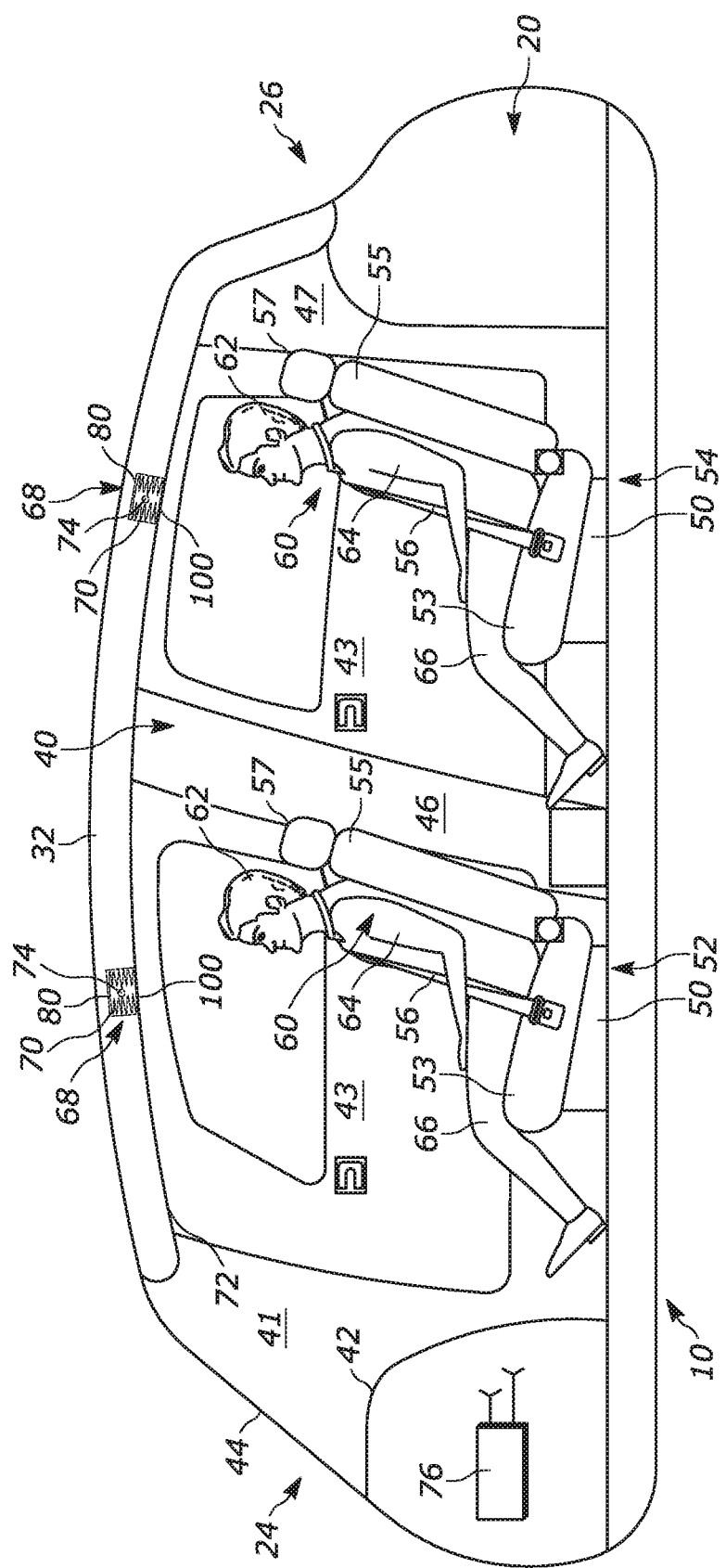
FIG. 2 is a schematic illustration of a cabin of the vehicle with a first seating arrangement and example airbags of the restraint system in a stored condition mounted in the roof.

The present invention relates generally to vehicle airbags and, in particular, relates to a roof-mounted airbag module. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. Each side 28, 30 includes side structure, namely, an A-pillar 41, a B-pillar 46, a C-pillar 47, and doors 43 connected to the pillars.

The first end 24 of the vehicle 20 includes an instrument panel 42 facing a passenger compartment or cabin 40. A windshield or windscreen 44 is located between the instrument panel 42 and the roof 32. The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, arranged in a forward-facing manner similar to that of conventional automobiles. It will be appreciated that the vehicle 20 could alternatively include more or fewer rows of seats 50 (not shown). In any case, a seatbelt 56 is associated with each seat 50 for restraining an occupant 60 in that seat.

Figure 3:
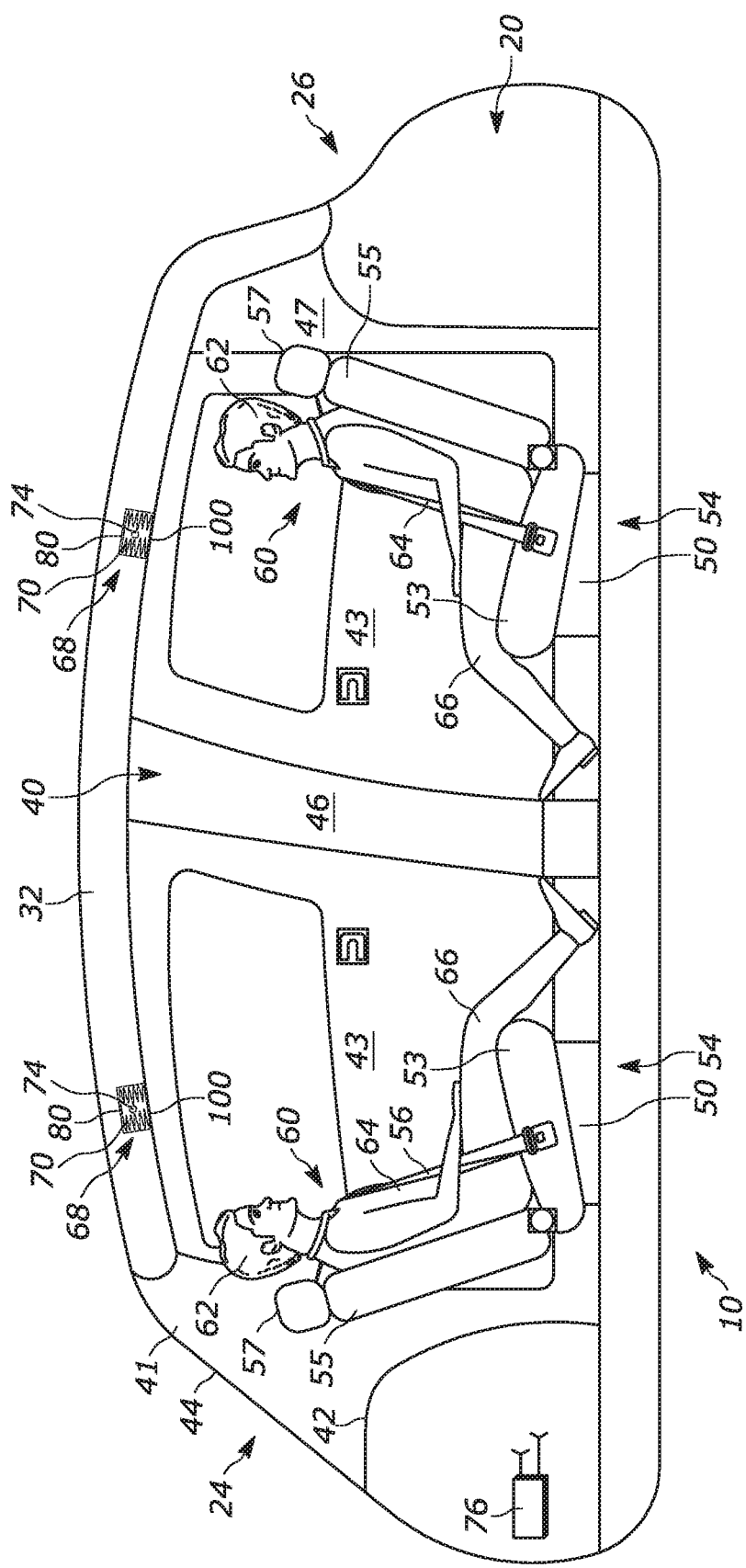
FIG. 3 is a schematic illustration of the cabin of the vehicle with a second seating arrangement and example airbags of the restraint system in a stored condition mounted in the roof.

In another seating arrangement shown in FIG. 3, the vehicle 20 includes two rows of seats 50 that face each other, with the front for 52 being rearward-facing and the rear row 54 being forward-facing. Regardless of the seating arrangement, each seat 50 includes a base or bottom 53 for receiving the legs 66 of the occupant 60. A seat back 55 extends from the base 53 towards the roof 32 and receives the upper torso 64 of the occupant 60. A headrest 57 is connected to the seat back 55 and receives the head 62 of the occupant 60. The position of the seat back 55 relative to the base 53 is adjustable by the user, either manually by a lever or electronically.

For the conventional, forward-facing seating arrangement of FIG. 2, in the event of a frontal crash, the occupants 60 of both the front and rear rows 52, 54 are restrained by their respective seatbelts 56. Additional restraints are, however, desirable for head and neck support. This additional protection is typically provided, at least for the front row 52 occupants, by instrument panel mounted airbags. In an autonomous vehicle 20, however, the instrument panel 42 can be reduced in size and/or removed altogether. Control interfaces for climate controls, GPS, navigation, entertainment, etc. can, for example, be provided in a center console area of the vehicle 20 located between the occupants 60 of the front and/or rear rows 52, 54.

That said, for the unconventional, forward-rearward seating arrangement of FIG. 3, in the event of a frontal crash, the occupants 60 of the forward-facing rear row 54 are restrained by their respective seatbelts 56. Occupants 60 of the rear-facing front row 52, while buckled, are supported in a frontal crash by the seat backs of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support. Moreover, the seats 50 in each row 52, 54 can rotate to face forward, rearward, inboard, outboard or in between (not shown) and, thus, it is desirable to provide occupant protection solutions that accommodate all the various seating configurations.

In either seating arrangement, since the front row 52 need not face forward and/or need not be in close proximity to the instrument panel 42 or the area where an instrument panel would normally reside, there can be a large volume of space between the front row and the forward cabin structure presented facing the front row. That said, it may not be efficient to deploy airbags from the forward cabin structure due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel or steering wheel, presents additional challenges.

To account for these challenges, the occupant restraint system 10 shown in FIGS. 1-8 includes vehicle occupant protection devices in the form of inflatable airbags 70 mounted in the roof 32 (e.g., behind the roof liner 72) above each seat 50 within the front and rear rows 52, 54. Mounting the airbags 70 in the roof liner 72 is convenient because the airbags can be positioned in locations with a desired proximity to the occupants 60 they are intended to help protect. This can help reduce the necessary inflatable volume of the airbags 70 and can also help provide a desired airbag deployment time without requiring an excessively high-volume inflator.

The airbags 70 are folded before being placed in the roof liner 72. The folded airbags 70 can each be provided in a cover or housing 80 as part of a module 68 that is then placed behind the roof liner 72. The occupant restraint system 10 also includes an inflator 74 positioned in each module 68 for providing inflation fluid to the respective airbag 70. The inflators 74 are operatively connected (e.g., by wires) to an airbag controller 76 that includes or communicates with one or more crash sensors (not shown). The airbag controller 76 is operative to determine the occurrence of a crash event and to actuate the inflators 74 in a known manner to inflate the airbags 70 associated therewith. The inflators 74 can be of any known type, such as stored gas, solid propellant, augmented or hybrid.

The airbags 70 can be constructed of any suitable material, such as nylon (e.g., woven nylon 6-6 yarns), and may be constructed in any suitable manner. For example, the airbags 70 may include one or more pieces or panels of material. If more than one piece or panel is used, the pieces or panels can be interconnected by known means, such as stitching, ultrasonic welding, heat bonding, or adhesives, to form the airbags 70. The airbags 70 can be uncoated, coated with a material, such as a gas impermeable urethane, or laminated with a material, such as a gas impermeable film.

The airbags 70 can therefore have a gas-tight or substantially gas-tight construction. Those skilled in the art will appreciate that alternative materials, such as polyester yarn, and alternatives coatings, such as silicone, may also be used to construct the airbags 70.

Each individual seat 50 can have a separate module 68 associated therewith (see FIG. 1) or a single module (with a corresponding airbag 70 and inflator 74) can be provided for the entirety of each row 52, 54 (not shown). Although the airbags 70 are identical for each row 52, 54 of the vehicle 20, the construction and operation of only the airbag associated with a seat 50 in the rear row 54 is discussed for brevity.

Figure 4:
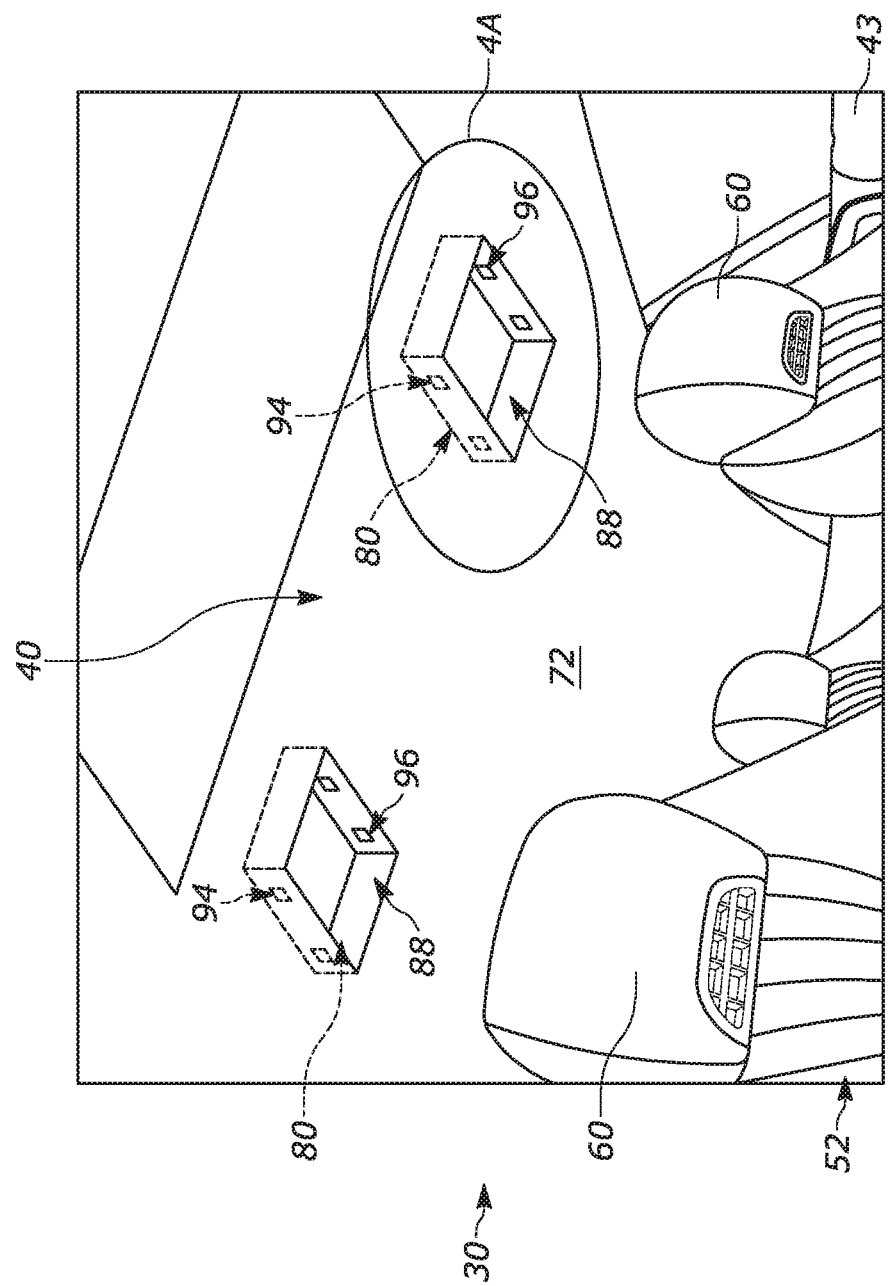
FIG. 4 is a schematic illustration of a roof liner of the vehicle from within the vehicle interior.
Figure 5A:
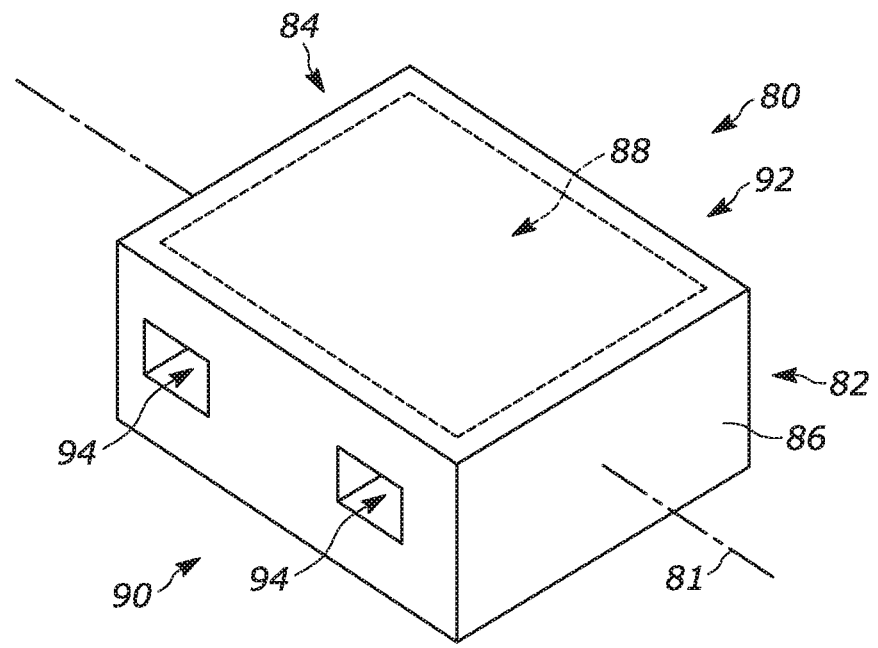
FIG. 5A is a top view of an airbag housing of the roof liner.
Figure 5B:
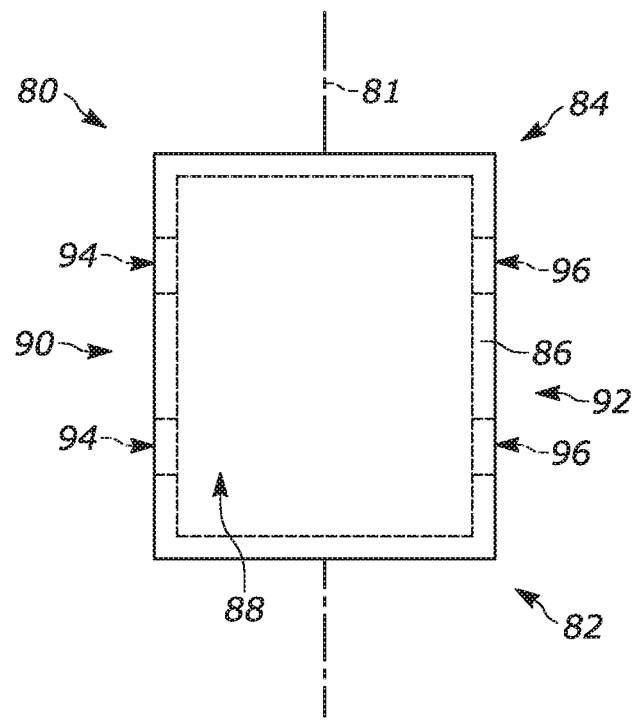
FIG. 5B is a bottom view of the housing of FIG. 5A.

Referring to FIGS. 4-5B, the roof liner 72 is configured to define or receive the housing 80. In other words, the housing 80 can be integrally formed in the roof liner 72 or the roof liner can define a pocket or cavity for receiving a prefabricated housing. In any case, the housing 80 extends along a centerline 81 from a first end 82 to a second end 84. The first and second ends 82, 84 can be arranged in the forward-rearward direction of the vehicle 20 (as shown) or the inboard-outboard direction (not shown).

The housing 80 includes a wall 86 defining an interior space 88. As shown, the wall 86 defines a substantially rectangular housing 80, although other shapes are contemplated. That said, the housing 80 includes a first side 90 and a second side 92. As shown, the first side 90 is an inboard side and the second side 92 is an outboard side. At least one opening 94 extends through the wall 86 on the first side 90. At least one opening 96 extends through the wall 86 on the second side 92.

As shown, a pair of openings 94 extends through the first side 90 and a corresponding pair of openings 96 extends through the second side 92. In one example, each of the openings 94, 96 is rectangular. The openings 94, 96 can be symmetrically arranged about the centerline 81 (as shown) or asymmetrically arranged (not shown). Alternatively, the openings 94 can extend through the wall 86 at the first end 82 and the openings 96 can extend through the wall at the second end 84 in a symmetric or asymmetric manner.

Figure 6A:
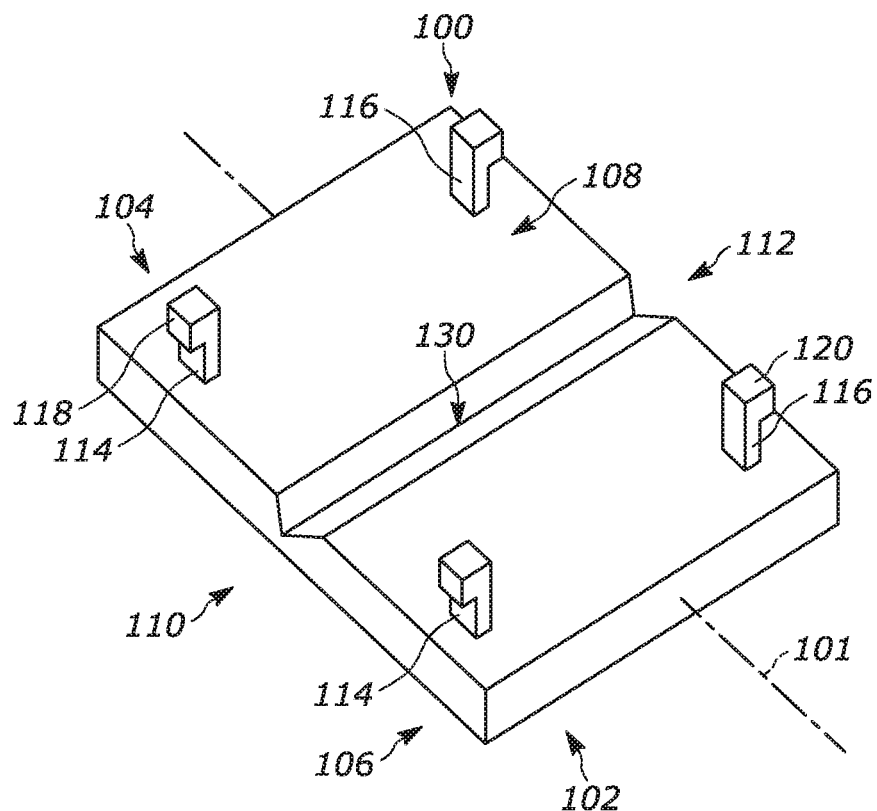
FIG. 6A is a bottom view of a door for the housing.
Figure 6B:
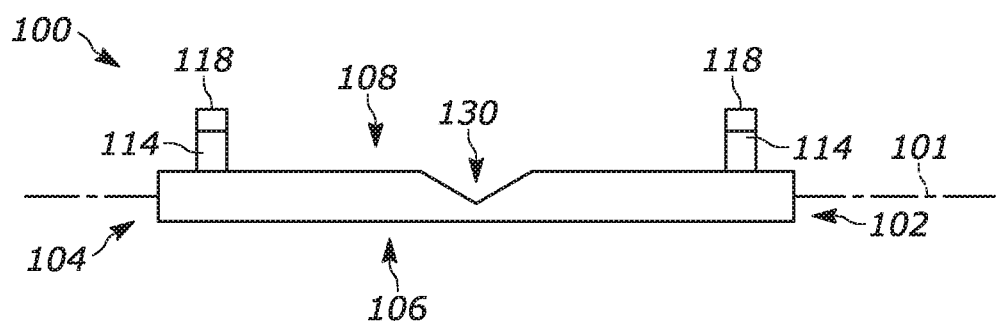
FIG. 6B is a side view of the door of FIG. 6A.

A door 100 is secured to the housing 80 for closing the interior space 88 and enclosing the airbag 70 and inflator 74 within the housing. As shown in FIGS. 6A-6B, the door 100 extends along a centerline 101 from a first end 102 to a second end 104. The door 100 includes a front surface or side 106 and a rear surface or side 108. The door 100 further includes a first or inboard side 110 and a second or outboard side 112. The door 100 can be configured to attach to the housing 80 with one or more types of fasteners.

In one instance, the fasteners constitute projections including legs 114, 116 that extend away from the rear side 108. More specifically, a pair of legs 114, 116 extends from the rear side 108 on the inboard side 110. A pair of legs 114, 116 extends from the rear side 108 on the outboard side 112. The legs 114, 116 are therefore positioned in pairs on opposite sides of the centerline 101. The legs 114, 116 can also be asymmetrically arranged (e.g., offset) about the centerline 101 and/or positioned on only one side 110 or 112 (not shown). In any case, the legs 114, 116 have a resilient construction that allows for a predetermined amount of bending relative to the door 100 without plastically deforming.

Each leg 114 includes a projection or tab 118 extending away from the centerline 101. Each leg 116 includes a projection of tab 120 extending away from the centerline 101. The tabs 118 have the same shape as the openings 94 in the housing 80. The tabs 120 have the same shape as the openings 96 in the housing 80. The tabs 118, 120 are configured to be slidably received in the respective openings 94, 96.

A weakened portion 130 is provided on the rear side 108 of the door 100. The weakened portion 130 can constitute a reduced thickness portion, a notch, a groove, etc., that extends the entire width of the door 100 between the sides 110, 112 (as shown) or only part of the width (not shown). The weakened portion 130 can extend transverse to the centerline 101 (e.g., perpendicular to the centerline) (as shown) or substantially parallel to or along the centerline (not shown). The weakened portion 130 can be formed by cutting, etching, molding or scoring the door 100 or otherwise reducing the structural integrity of the door along a predefined path. The weakened portion 130 can also be formed as a tear seam.

Figure 7:
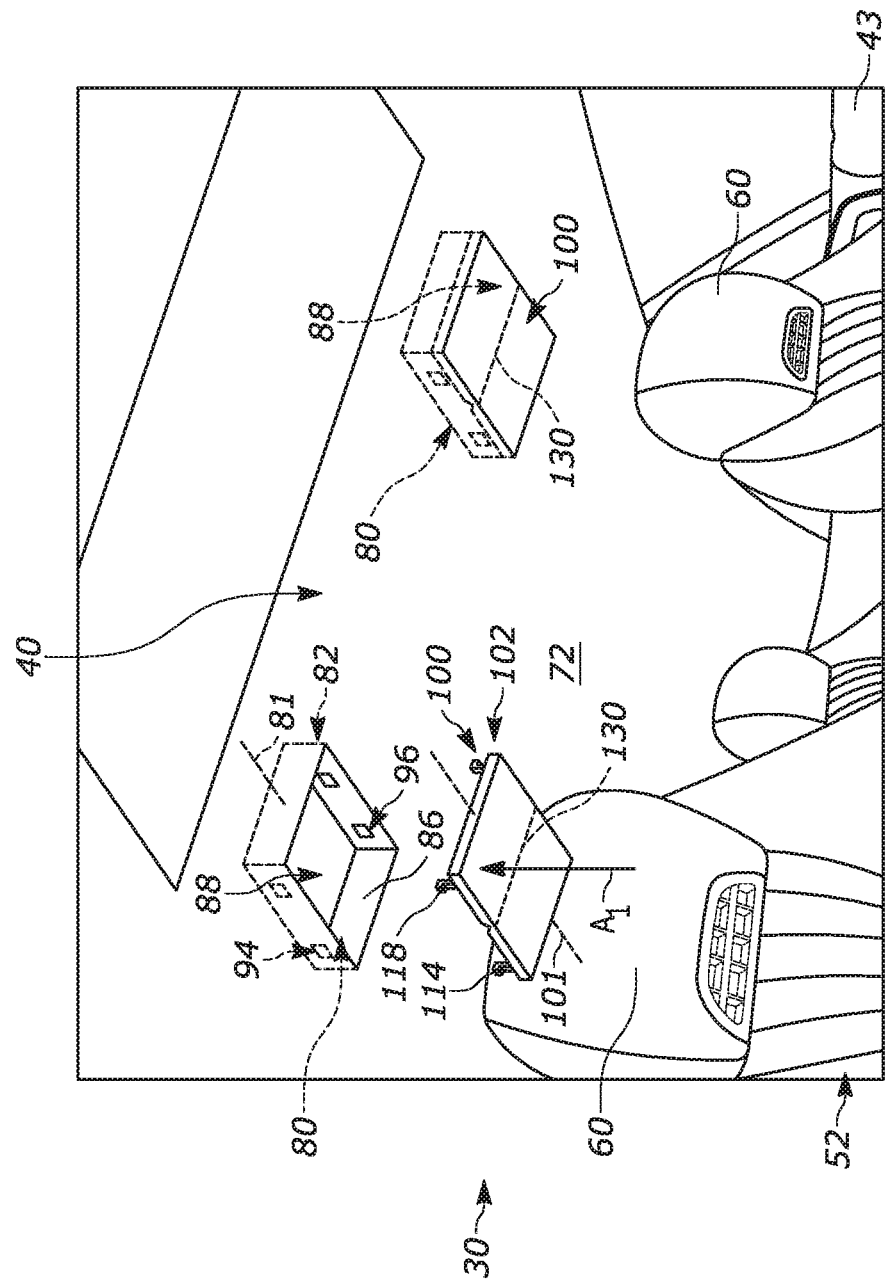
FIG. 7 is a schematic illustration of the door being installed on the housing.

As shown in FIG. 7, the door 100 is connected to the housing 80 by first aligning the centerlines 81, 101 thereof such that the first ends 82, 102 are aligned and the second ends 84, 104 are aligned. The door 100 is then moved towards the interior space 88 in the manner $A_1$. When this occurs, the tabs 118, 120 engage the wall 86 and are deflected towards the centerline 101. The tabs 118, 120 and/or leading edge of the wall 86 can be tapered (not shown) to facilitate initial entry of the tabs 118, 120 into the interior space 88.

The tabs 118, 120 slide along the wall 86 until they become aligned with the respective openings 94, 96. When this occurs, the resilient construction of the projections causes the tabs 118, 120 to move outward from the centerline 101 and snap into the corresponding openings 94, 96 in the wall 86. In other words, the projections on the door 100 form snap-fit connections with the housing 80. The door 100 closes the interior space 88 and encloses the airbag 70 within the housing 80. Moreover, the front side 106 of the door 100 is flush with the roof liner 72. The housing 80 and door 100 could also be configured such that the front side 106 is recessed from the roof liner 72 when installed on the housing 80 (not shown).

Since the weakened portion 130 is provided on the rear side 108 it is concealed from view by the occupants 60 in the cabin 40 when the door 100 is installed on the housing 80. The interface between the periphery of the door 100 and the entry to the interior space 88 can be tailored to be low profile or otherwise substantially concealed from the occupants 60. Furthermore, a headliner fabric or the like (not shown) can cover the roof liner 72 and door 100 and thereby help to further conceal the interface.

Figure 8:
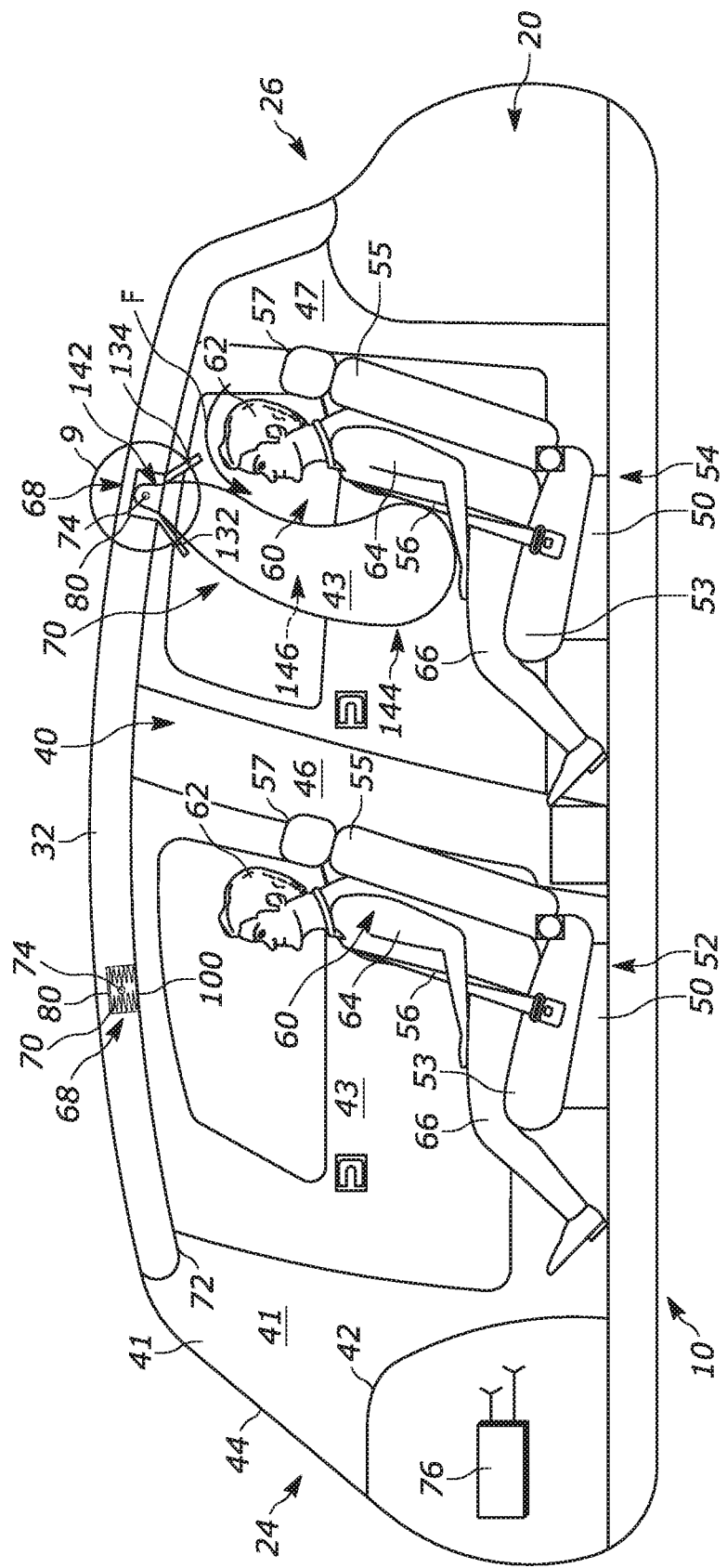
FIG. 8 is a schematic illustration of the cabin of FIG. 2 with the airbag in a deployed condition.
Figure 9:
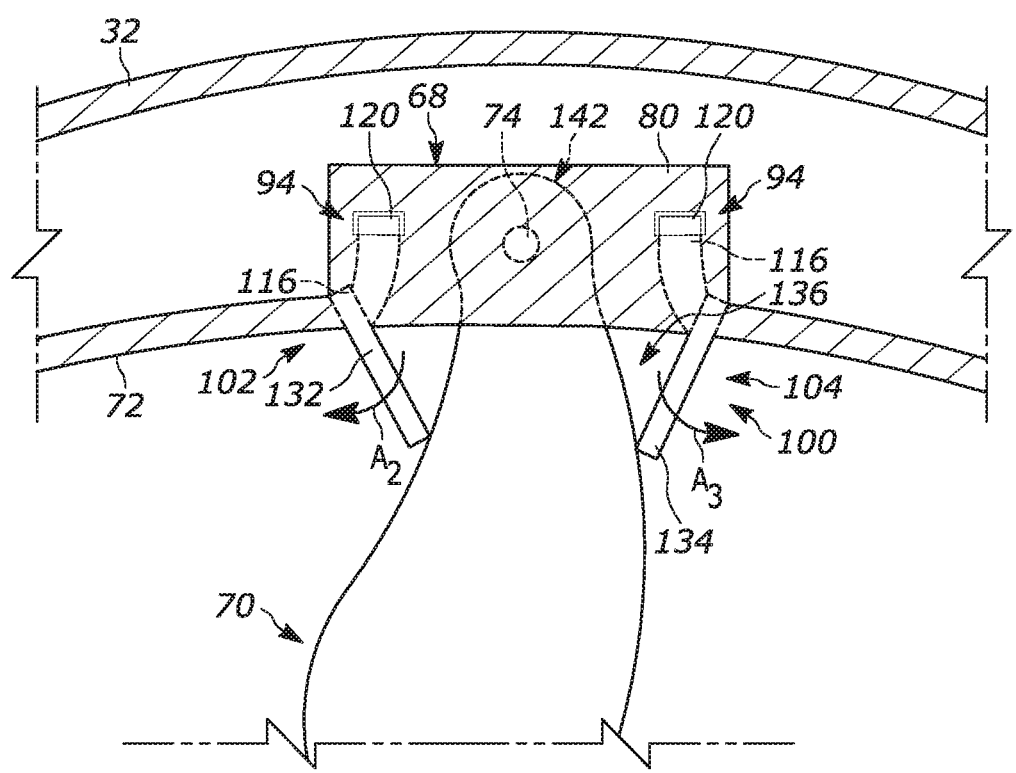
FIG. 9 is an enlarged view of a portion of FIG. 7.

Referring to FIGS. 8-9, upon sensing the occurrence of an event for which inflation of the airbag 70 is desired, such as a frontal vehicle collision, the controller 76 provides signals to the inflator 74. Upon receiving the signals from the controller 76, the inflator 74 is actuated and provides inflation fluid to the inflatable volume of the airbag 70 in a known manner. The inflating airbag 70 exerts a force on the roof liner 72, which thereby exerts a force on the door 100.

When this occurs, the weakened portion 130 ruptures to separate the door 100 into first and second open segments 132, 134. The inflating airbag 70 causes the first segment 132 to pivot in the manner $A_2$ about the projections 118, 120 at the first end 102 towards the front end 24 of the vehicle 20. The second segment 134 is pivoted in the manner $A_3$ about the projections 118, 120 at the second end 104 towards the rear end 26 of the vehicle 20. As a result, the segments 132, 134 separate to define an opening 136 through which the airbag 70 can inflate out of the housing 80 to a deployed condition extending into the cabin 40 in front of the occupant 60. The resilience and/or shape of the legs 114, 116 can be configured to help guide the airbag 70 along a desired deployment path into the cabin 40 by controlling the size and/or shape of the opening 136.

The airbag 70, while inflated, helps protect the vehicle occupant 60 in the rear row 54 by absorbing the impact of the occupant. To this end, the airbag 70, when deployed, extends from an upper end 142 to a lower end 144 and defines an inflatable volume 146. The upper end 142 is connected to the vehicle 20 and fluidly connected to the inflator 74. The lower end 144 is positioned adjacent an occupant 60 in the rear row 54.

Because the occupant 60 is belted, a frontal crash resulting in forward occupant movement causes the occupant to bend at the waist and follow an angled or arcuate path toward the airbag 70, as indicated generally by the arrow F in FIG. 8. Once the moving occupant 60 engages the inflated airbag 70, the airbag is urged to move in the direction F.

As noted, there is no vehicle structure in position to act as a reaction surface to constrain movement of the deployed airbag 70. The roof 32 and occupant 60 therefore replace the reaction surface typically required for frontal passenger airbags. In other words, the roof 32 and occupant 60 can cooperate to limit or prevent movement of the airbag 70 in the direction F. To this end, the upper end 142 is connected to the roof 32. The lower end 144 is configured to engage the occupant's lap/lower torso 66. Both ends 142, 144 of the airbag 70 are therefore held while the occupant 60 engages and penetrates the airbag 70 and, thus, the airbag can provide a ride-down effect on the penetrating occupant without requiring any support from structure presented forward of the occupants.

Other example roof-mounted airbag configurations that can be used with the module 68 are shown and described in International Application No. PCT/US19/20182, filed Mar. 2, 2019, the entirety of which are incorporated by reference herein. In all of these example configurations vehicle structure toward which the non-occupant facing surface of the airbag is presented is not used as a reaction surface.

Figure 10:
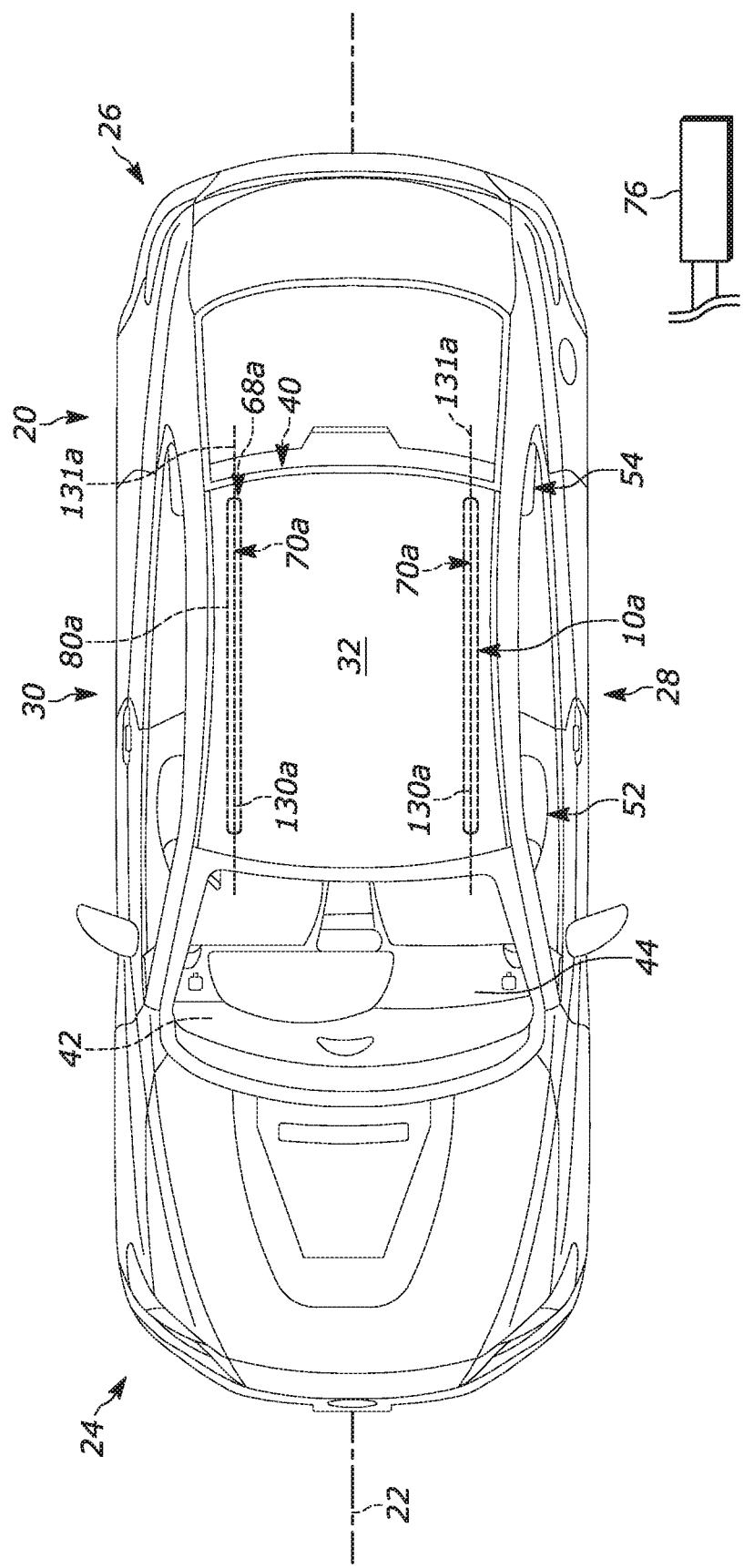
FIG. 10 is a top view of the vehicle including another example occupant restraint system.

With this in mind, the module shown and described herein can also be configured for side curtain applications (see FIG. 10). In these configurations, the housing 80a extends in the forward-rearward direction of the vehicle 20 substantially the entire length of the cabin 40 laterally between the seats 50 and the vehicle side structure. The weakened portion 130a can extend along the length such that the segments resulting from rupturing of the door 100a are significantly shorter than if the weakened portion extending perpendicular to the centerline 101a. As a result, the segments 132a, 134a of the door 100a can pivot inboard and outboard, respectively, away from the centerline 101a to define the opening for the deploying airbag 70a. It will be appreciated that the door 100a could alternatively be configured such that the open segments 132a, 134a pivot fore and aft away from one another (not shown).

Figure 11A:
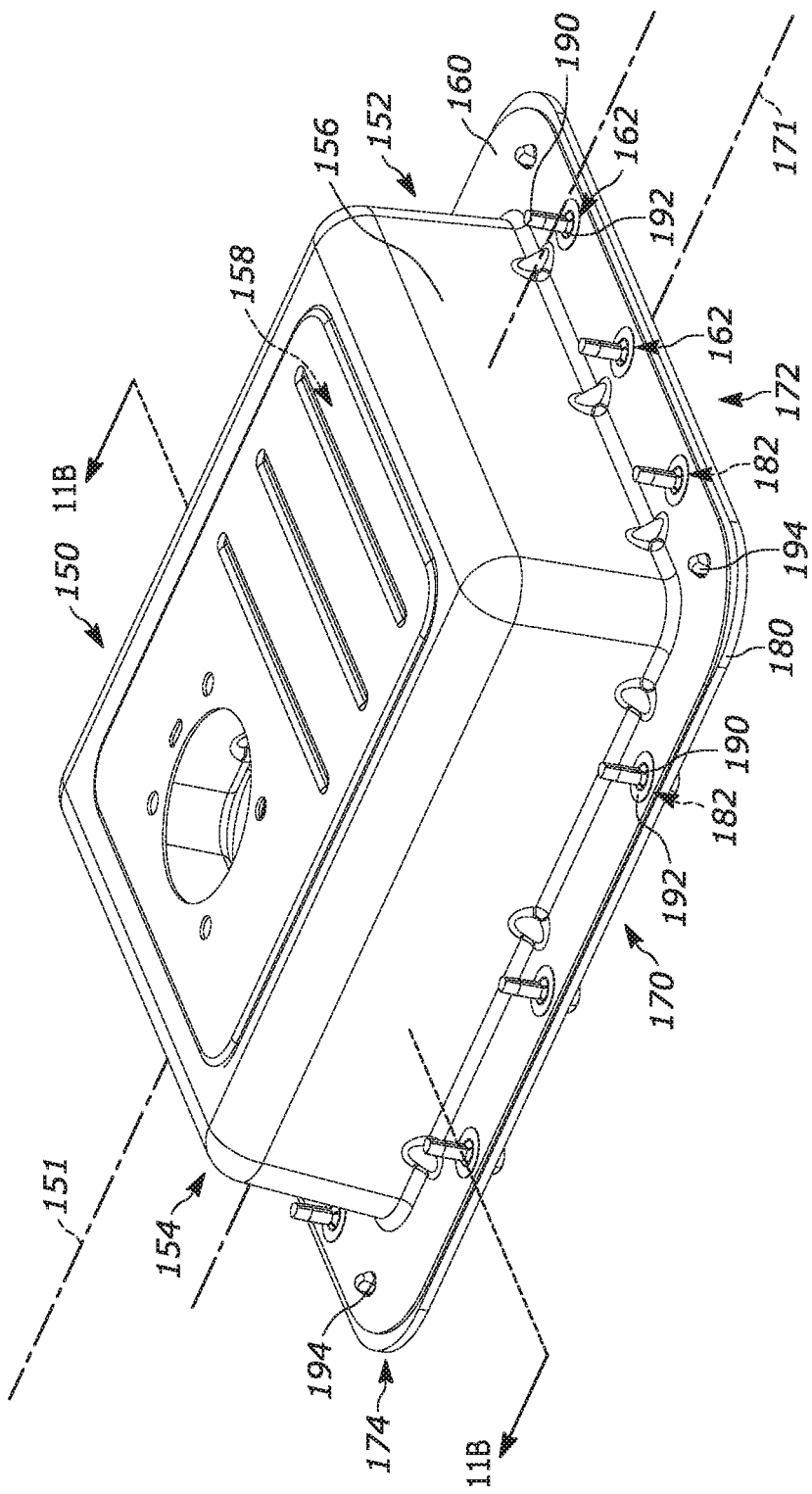
FIG. 11A is a front view of another example housing.
Figure 11B:
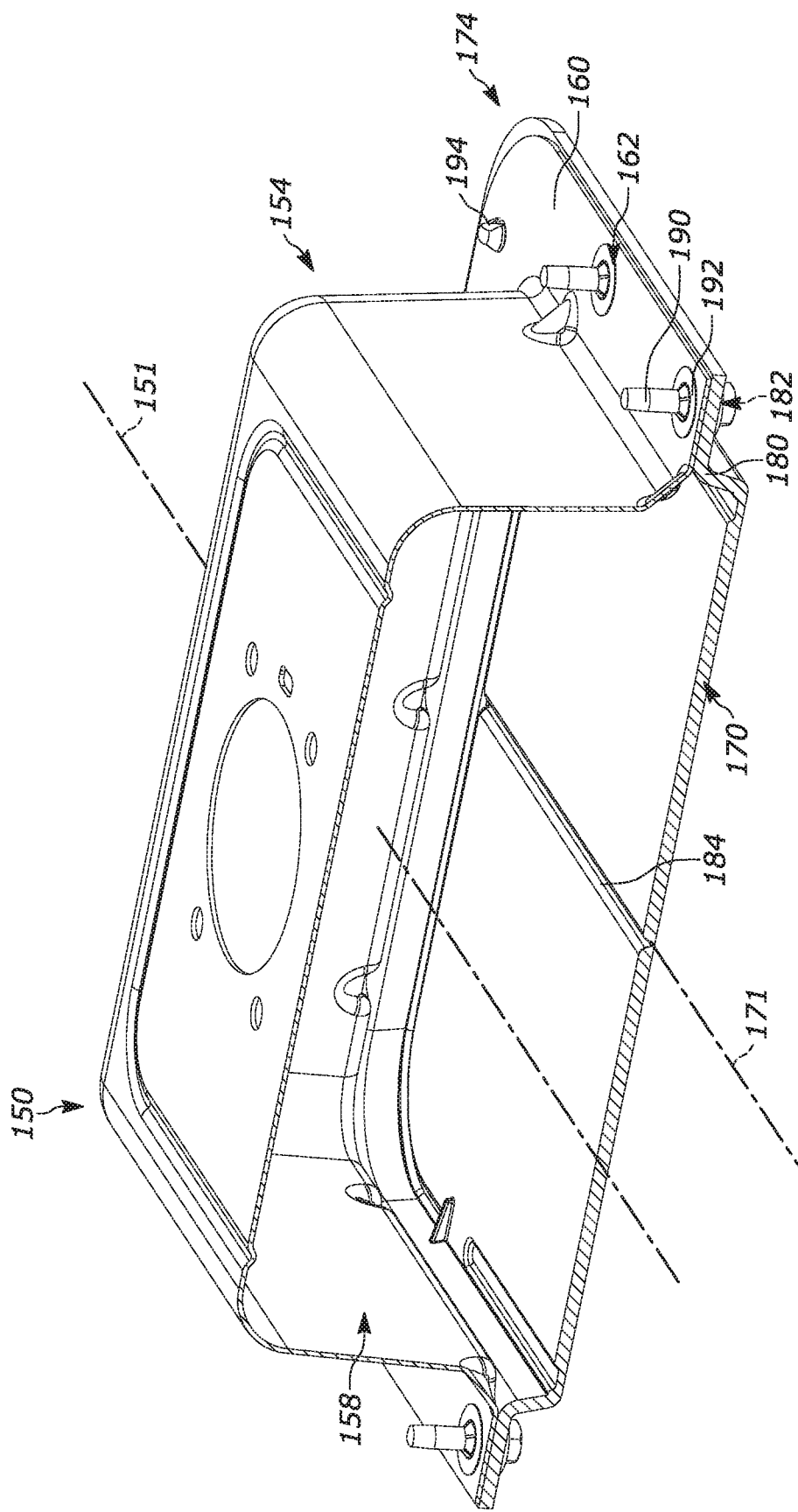
FIG. 11B is a section view taken along line 11B-11B of FIG. 11A.

In another example shown in FIGS. 11A-11B, another example housing 150 and door 170 are provided. The housing 150 extends along a centerline 151 from a first end 152 to a second end 154. The first and second ends 152, 154 can be arranged in the forward-rearward direction of the vehicle 20 or the inboard-outboard direction. The housing 150 includes a wall 156 defining an interior space 158. The wall 156 includes an outwardly extending flange 160. Openings 162 extend through the flange 160 and are arranged along the entire perimeter of the housing 150.

The door 170 is secured to the housing 150 for closing the interior space 158 and enclosing the airbag and inflator (not shown) within the housing. The door 170 extends along a centerline 171 from a first end 172 to a second end 174. The weakened portion 174 can extend parallel to the centerline 171 (as shown) or transverse (e.g., perpendicular) thereto.

The door 170 includes a flange 180 having openings 182 extending therethrough. The openings 182 are sized and arranged about the flange 180 in the same manner as the openings 162 in the flange 160.

In this example, the fasteners for securing the door 170 to the housing 150 constitute screws or threaded connectors 190. In particular, the screws 190 extend through the aligned openings 162, 182. A washer, nut or pal nut 192 can be secured to the threaded end of the screw 190 to rigidly fasten the door 170 to the housing 150 and close the interior space 158. Alternatively or additionally, fasteners constituting push-in clips 194 help to secure the door 170 to the housing 150.

Figure 12:
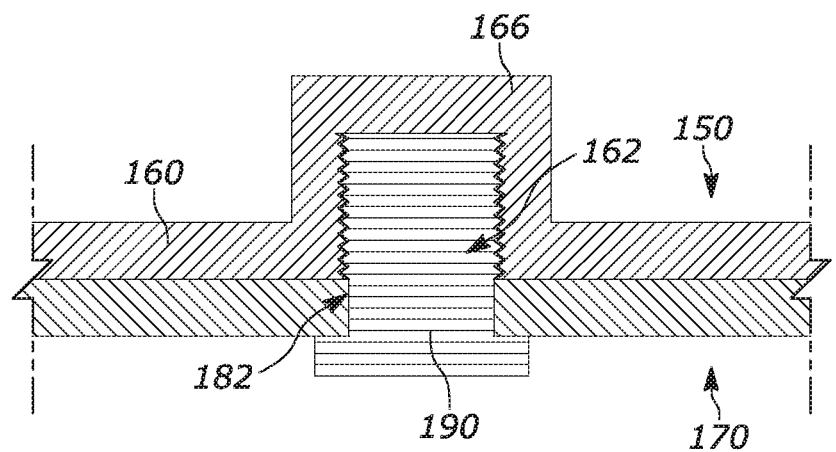
FIG. 12 is a schematic illustration of an example fastener for securing a door to the housing of FIG. 11A.
Figure 13:
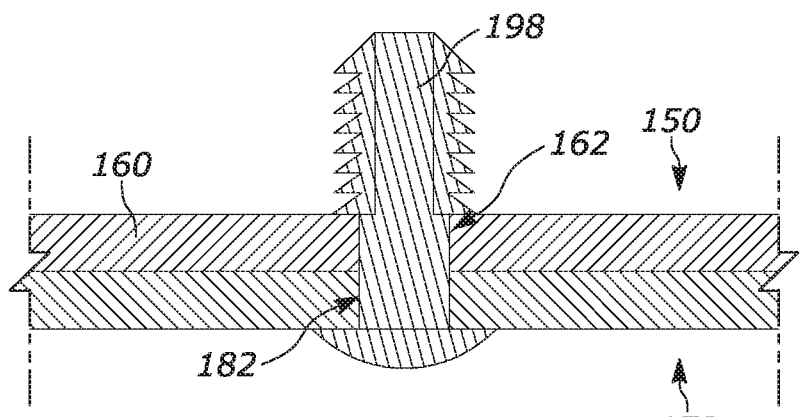
FIG. 13 is a schematic illustration of another example fastener for securing a door to the housing of FIG. 11A.
Figure 14:
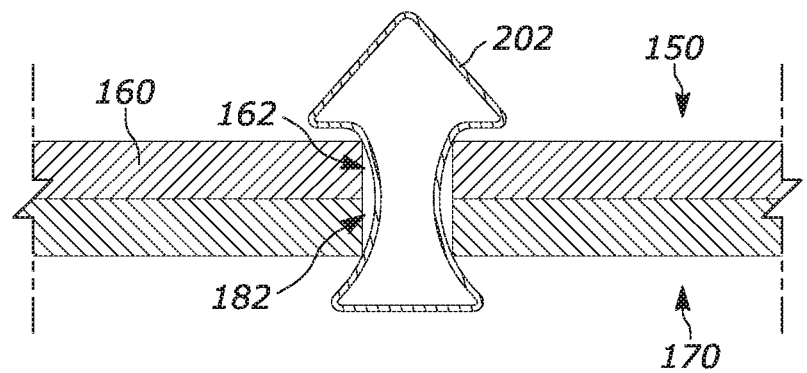
FIG. 14 is a schematic illustration of another example fastener for securing a door to the housing of FIG. 11A.

FIGS. 12-14 illustrate additional example fasteners used to secure the door 170 to the housing 150. In FIG. 12, the screws 190 threadably engage standoffs or threaded projections 166 on the flange 160 of the housing 150 to fasten the door 170 thereto. In FIG. 13, the fasteners constitute push-in Christmas Tree clips 198. In FIG. 14, the fasteners constitute push-in tinnerman clips 202. It will be appreciated that the Christmas Tree clips 198 and the tinnerman clips 202 both form snap-in connections with the housing 150 and that both could be formed integrally with the door 170 or be a separate component therefrom. Other fasteners, e.g., snaps, screws, clips, etc., are contemplated for securing the door 170 to the housing 150. Moreover, the fastener can also constitute a welded connection (e.g., ultrasonic welded) and/or adhesive connection between the door 170 and housing 150.

Figure 15:
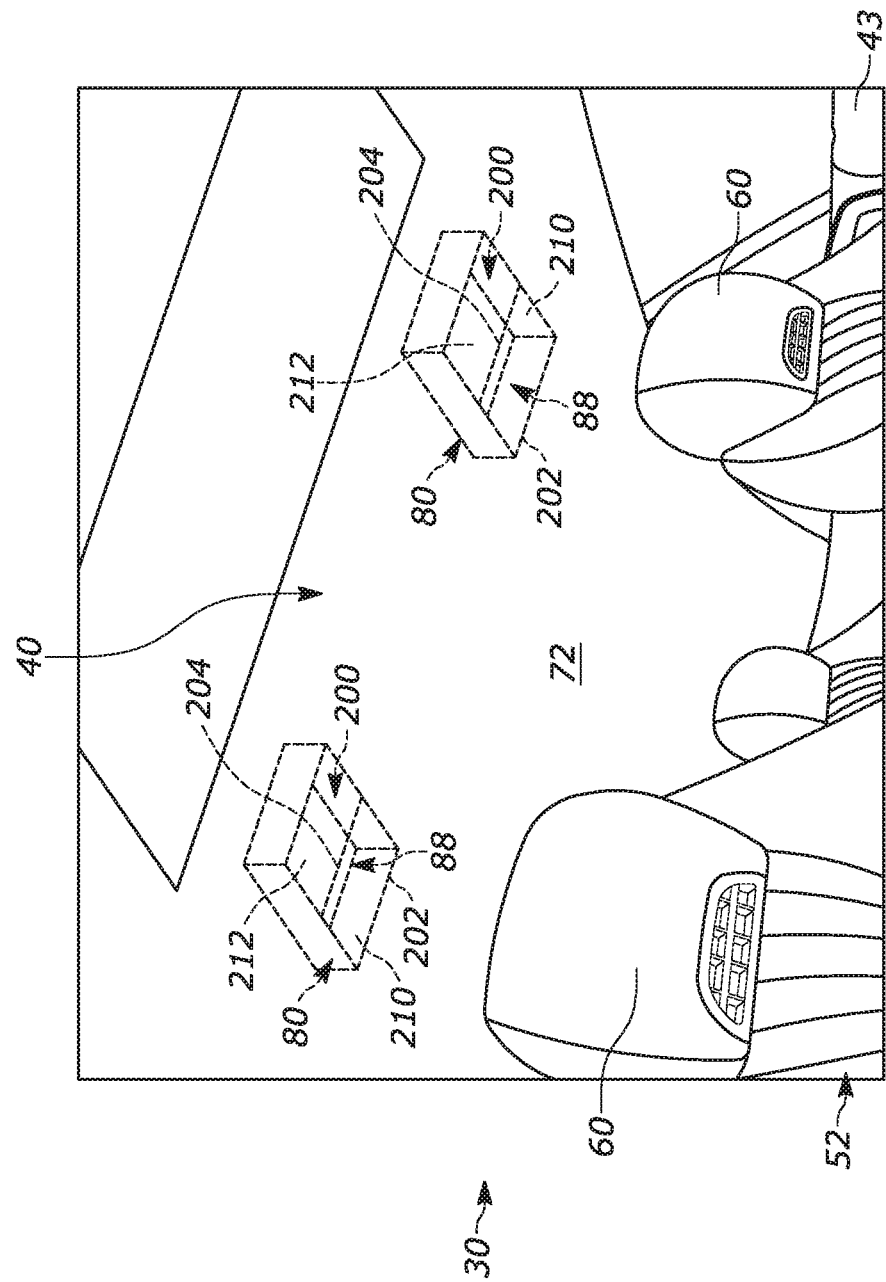
FIG. 15 is a schematic illustration of another example roof liner of the vehicle from within the vehicle interior.
Figure 16:
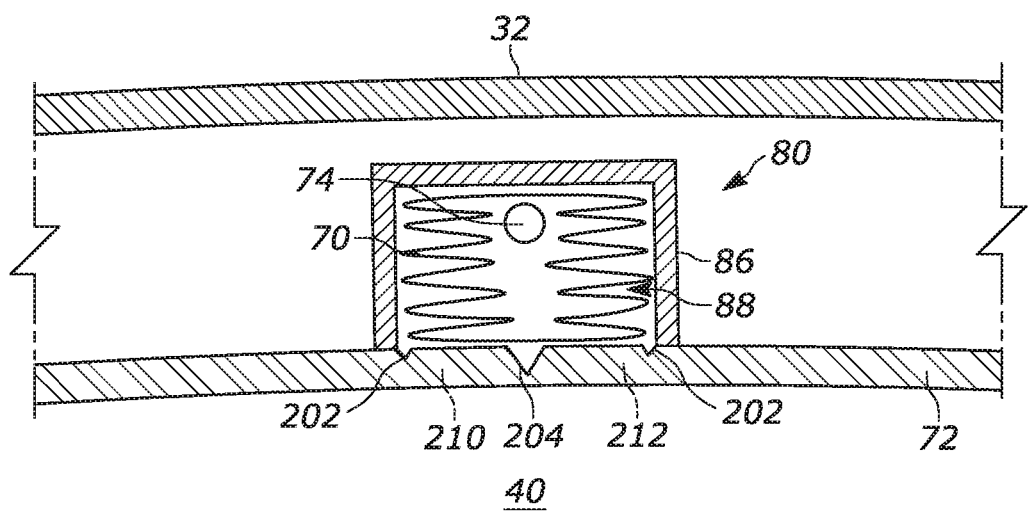
FIG. 16 is a schematic illustration is a section view of the roof liner of FIG. 15.

In another example shown in FIGS. 15-16, the door 200 is integrally formed in the roof liner 72. To this end, the roof liner 72 can include a weakened portion, score line, reduced thickness portion, etc., which is indicated at 202 to helps to define a door 200 aligned with the interior space 88 of the housing 80. The door 200 can abut the wall 86 of the housing 80 and therefore act to enclose the airbag 70 and inflator 74 in the housing 80. An additional weakened portion, score line, etc., indicated at 204 can function akin to the weakened portion 130 in the door 100 and allow the door 200 to separate into first and second segments 210, 212. The weakened portion 202 defining the door 200 can surround or encircle the weakened portion 204 separating the segments 210, 212.

The weakened portions 202 are configured to allow the segments 210, 212 to separate and pivot away from one another but remain connected to the remained of the roof liner 72. Consequently, the segments 210, 212 can separate to define an opening through which the airbag 70 can inflate out of the housing 80 to a deployed condition extending into the cabin 40 in front of the occupant 60. The weakened portions 202, 204 can be configured to produce segments 210, 212 that help guide the airbag 70 along a desired deployment path into the cabin 40 by controlling the size and/or shape of the opening 136.

Although the housings 80 are shown and described herein as being positioned within or behind the roof liner 72, it will be appreciated that the housings could likewise be provided within any of the seats 50 or along the vehicle side structure (e.g., within the doors 43, A-pillar 41, B-pillar 46 or C-pillar 47). When the airbags 70 are provided in the vehicle seats 50, the airbags are mounted to the seats outboard of the seat centerline regardless of whether the seat is forward-facing or rearward-facing and regardless of the row 52, 54.

When the airbags 70 are provided along the vehicle side structure, the airbags associated with the front row 52 can be mounted in the B-pillar 46 or front doors 43 for the forward-facing seating arrangement. The airbags 70 associated with the rear row 54 are mounted in the C-pillar 47 or rear doors 43 (see FIG. 2). In the rearward-facing seating arrangement, the airbags 70 associated with the front row 52 can be mounted in the A-pillar 46 or front doors 43. The airbags 70 associated with the rear row 54 can be mounted in the C-pillar 47 or rear doors 43 (see FIG. 3). In each instance, the inflating airbag 70 causes the door 100 to rupture at the weakened portion 130, thereby allowing the airbag to inflate to the deployed condition in position to help protect the associated occupant(s) 60 of the vehicle 20.

The housing of the present invention is advantageous in that the weakened portion is provided on the rear side of the door and, thus, is not visible to the occupants. Moreover, the roof liner, seat or side structure can be covered with a liner or the like that further helps to conceal the door and housing, i.e., make them discrete, thereby maintaining an aesthetically pleasing vehicle interior appearance while providing occupant protection. In each case, the door can rupture in a controlled manner to affect deployment of the airbag in a desirable way.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

We claim:

1. A module for an airbag for helping to protect an occupant of a vehicle having a roof and an interior with a seat for the occupant, comprising:
   a housing positioned in a pocket within a roof liner of the roof and including a wall with openings extending therethrough, the wall defining an interior space for receiving the airbag;
   a door for closing the interior space, the door including a weakened portion that ruptures in response to inflation of the airbag for allowing the airbag to deploy into the cabin; and
   fasteners connected to the door and extending into the openings for securing the door to the housing.

2. The module recited in claim 1, wherein the door includes a first side facing the roof and a second, opposing side facing the vehicle interior, the weakened portion extending from the first side towards the second side.

3. The module recited in claim 1, wherein the weakened portion extends in an inboard-outboard direction of the vehicle.

4. The module recited in claim 1, wherein the weakened portion extends in a forward-rearward direction of the vehicle.

5. The module recited in claim 1, wherein the door is concealed from view from the occupant prior to inflation of the airbag.

6. The module recited in claim 1, wherein the fasteners comprise projections integrally formed with the door.

7. The module recited in claim 6, wherein the projections form snap-fit connections with the corresponding openings in the wall.

8. The module recited in claim 6, wherein the openings are provided in pairs on opposite sides of a centerline of the housing and the projections are provided in pairs on opposite sides of a centerline of the door.

9. The module recited in claim 1, wherein the housing is positioned laterally between the seats and side structure of the vehicle.

10. The module recited in claim 1, wherein an interior of the wall of the housing is exposed to the airbag and the door abuts the wall to close the interior space and thereby enclose the airbag within the housing.

11. The module recited in claim 1, wherein the wall defines a perimeter, the fasteners comprising projections integrally formed with the door and extending inside the perimeter and outward into the openings to form a snap-fit connection with the wall to close interior space.

12. The module recited in claim 11, wherein the projections are exposed to the airbag when connected to the wall.

13. A module for an airbag for helping to protect an occupant of a vehicle having a roof and an interior with a seat for the occupant, comprising:
a housing positioned in the roof and including a wall with openings extending therethrough, the wall defining an interior space for receiving the airbag with the openings being positioned on opposite sides of the interior space; and
a door including a first side facing the roof and a second, opposing side facing the vehicle interior, projections extending from the first side and away from one another forming snap-fit connections with the openings for securing the door to the housing and closing the interior space, a weakened portion extending from the first side towards the second side and rupturing in response to inflation of the airbag for allowing the airbag to deploy into the cabin.

14. The module recited in claim 13, wherein the housing is integrally formed in a roof liner of the roof.

15. The module recited in claim 13, wherein the housing is positioned in a pocket within a roof liner of the roof.

16. The module recited in claim 13, wherein the weakened portion extends in an inboard-outboard direction of the vehicle.

17. The module recited in claim 13, wherein the weakened portion extends in a forward-rearward direction of the vehicle.

18. The module recited in claim 13, wherein the door is concealed from view from the occupant prior to inflation of the airbag.

19. The module recited in claim 13, wherein the housing is positioned laterally between the seats and side structure of the vehicle.

20. The module recited in claim 13, wherein the openings are provided in pairs on opposite sides of a centerline of the housing and the projections are provided in pairs on opposite sides of a centerline of the door.

* * * * *